(12) United States Patent
Ueba

(10) Patent No.: US 11,169,490 B2
(45) Date of Patent: Nov. 9, 2021

(54) TRANSPORT DEVICE

(71) Applicant: MURATA MACHINERY, LTD., Kyoto (JP)

(72) Inventor: Hiroyuki Ueba, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 245 days.

(21) Appl. No.: 16/507,090

(22) Filed: Jul. 10, 2019

(65) Prior Publication Data
US 2020/0050155 A1 Feb. 13, 2020

(30) Foreign Application Priority Data

Aug. 7, 2018 (JP) ............................. JP2018-148464

(51) Int. Cl.
| | |
|---|---|
| *G06F 7/00* | (2006.01) |
| *G05B 1/04* | (2006.01) |
| *G05B 19/418* | (2006.01) |
| *B65G 1/137* | (2006.01) |
| *G06Q 10/08* | (2012.01) |

(52) U.S. Cl.
CPC ............... *G05B 1/04* (2013.01); *B65G 1/137* (2013.01); *G05B 19/4189* (2013.01); *G06Q 10/087* (2013.01)

(58) Field of Classification Search
CPC ............. G05B 1/04; G05B 19/4189; G05B 2219/31006; B65G 1/137; B65G 2207/40; B65G 2203/044; B65G 2203/0208; B65G 1/0407; B65G 1/0492; B65G 35/00; G06Q 10/087; Y02P 90/02
USPC ................. 700/213–214, 217, 228–229
See application file for complete search history.

(56) References Cited

U.S. PATENT DOCUMENTS

| | | | |
|---|---|---|---|
| 2011/0054689 A1* | 3/2011 | Nielsen ............... | G05D 1/0088 700/258 |
| 2020/0319219 A1* | 10/2020 | Vansickler ....... | G01N 35/00732 |

FOREIGN PATENT DOCUMENTS

JP       2003-246415 A       9/2003

* cited by examiner

*Primary Examiner* — Yolanda R Cumbess
(74) *Attorney, Agent, or Firm* — Keating & Bennett, LLP

(57) ABSTRACT

A stacker crane includes a transporter, a slide fork, first to third sensors, a counter, and a main controller. The transporter moves from a shelf on which an article is supported to an empty shelf. The slide fork is mounted on the lift stage and transfers the article to and from the shelf. The first, second and third sensors recognize an abnormality of the article moved by the movement of the transporter. The counter counts the number of event occurrences. When an abnormality is recognized by the sensor, the main controller reduces a moving speed of the transporter, and when no abnormality is recognized by the sensor upon reduction in the moving speed, the movement of the transporter is continued. When the number of event occurrences reaches a first threshold, the stacker crane is brought into an abnormal-stop state.

5 Claims, 14 Drawing Sheets

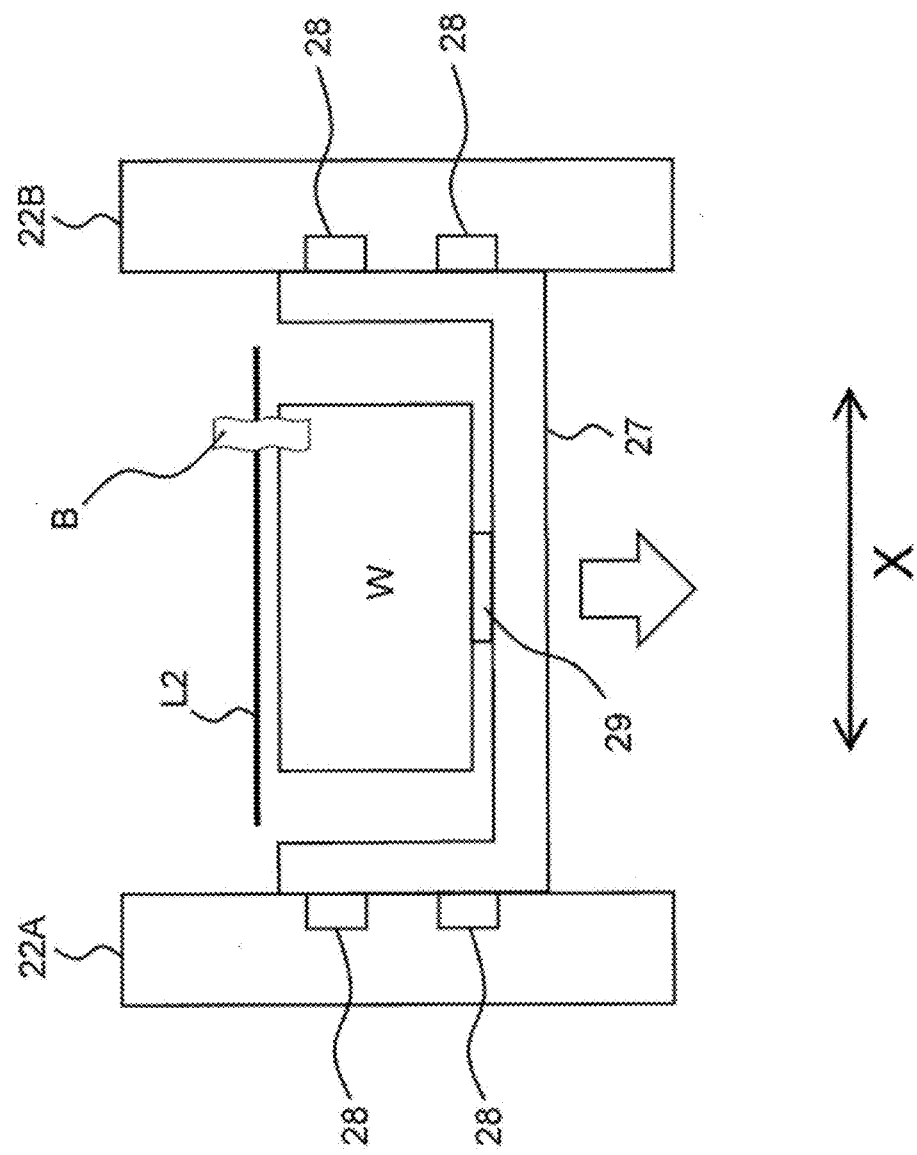

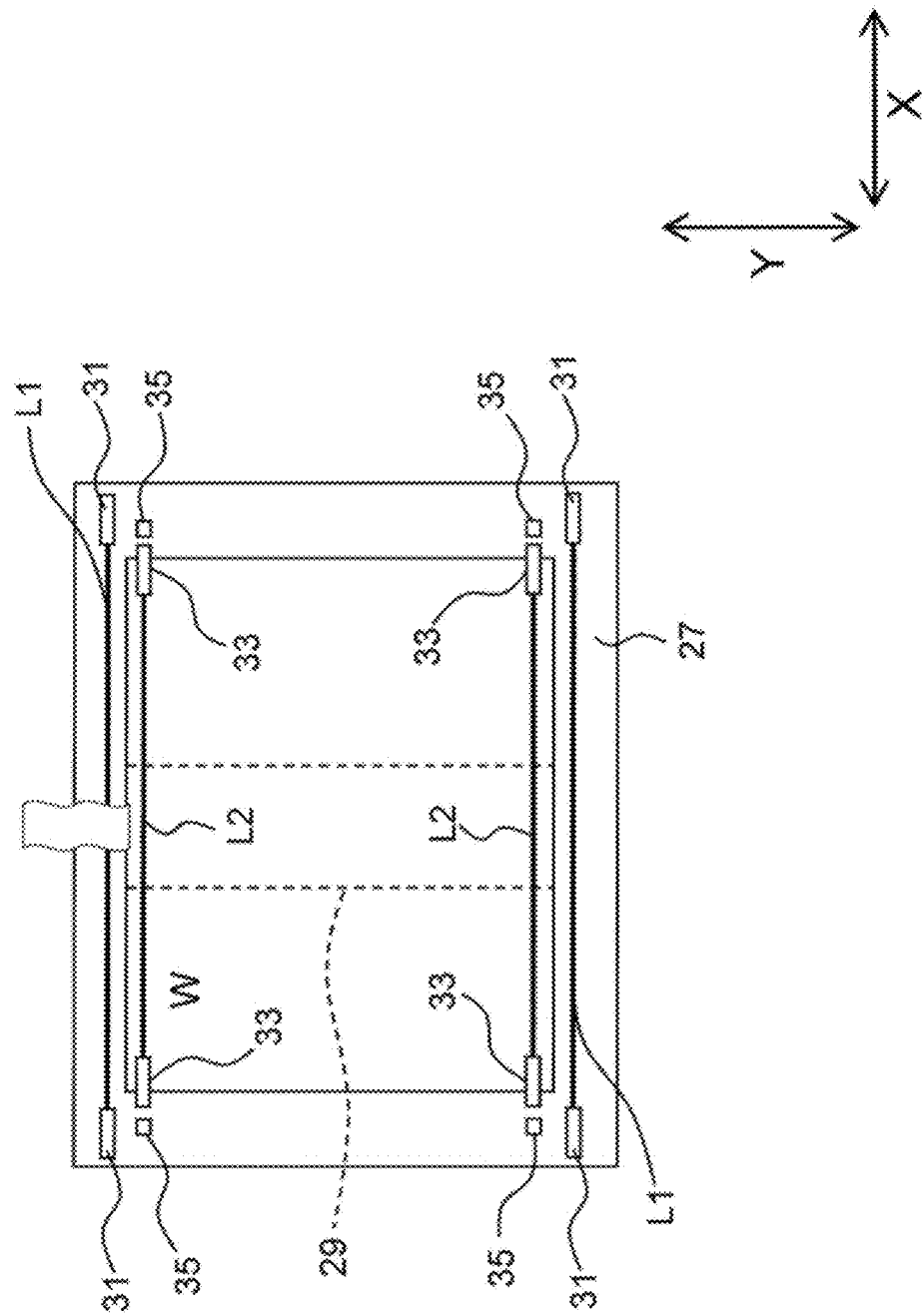

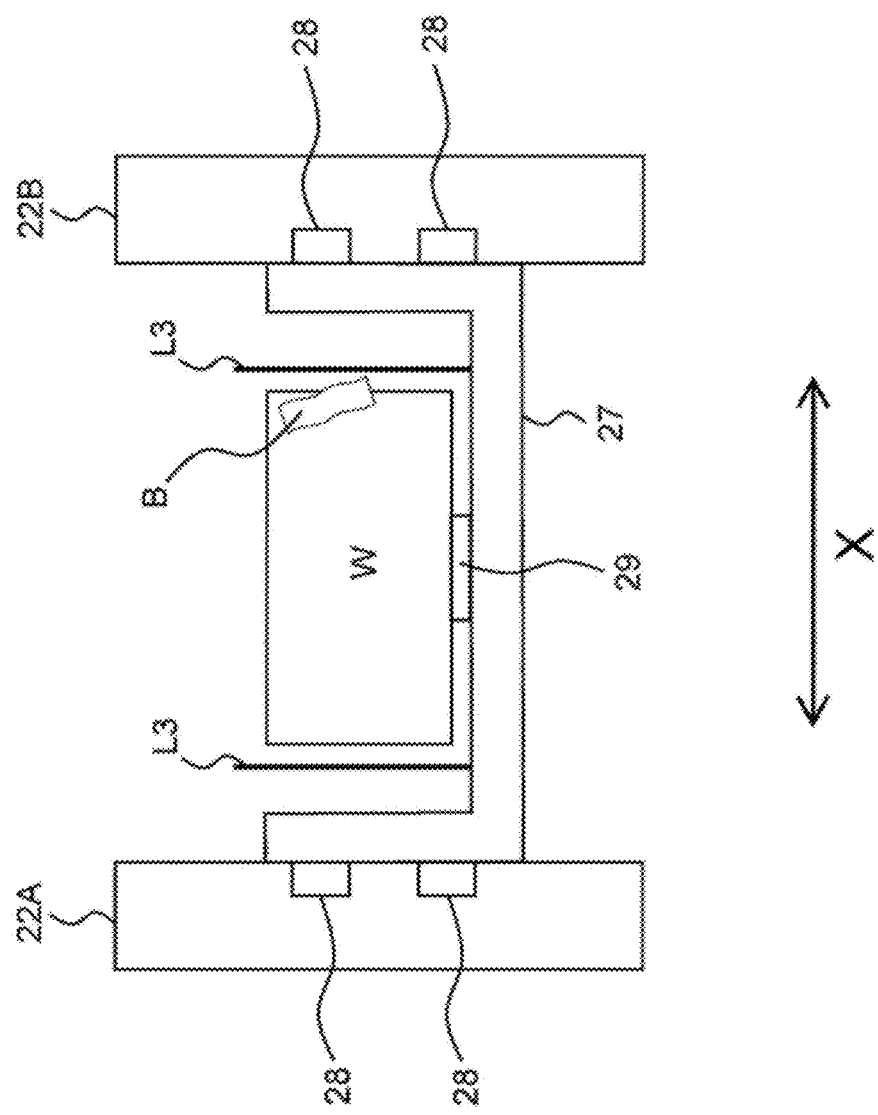

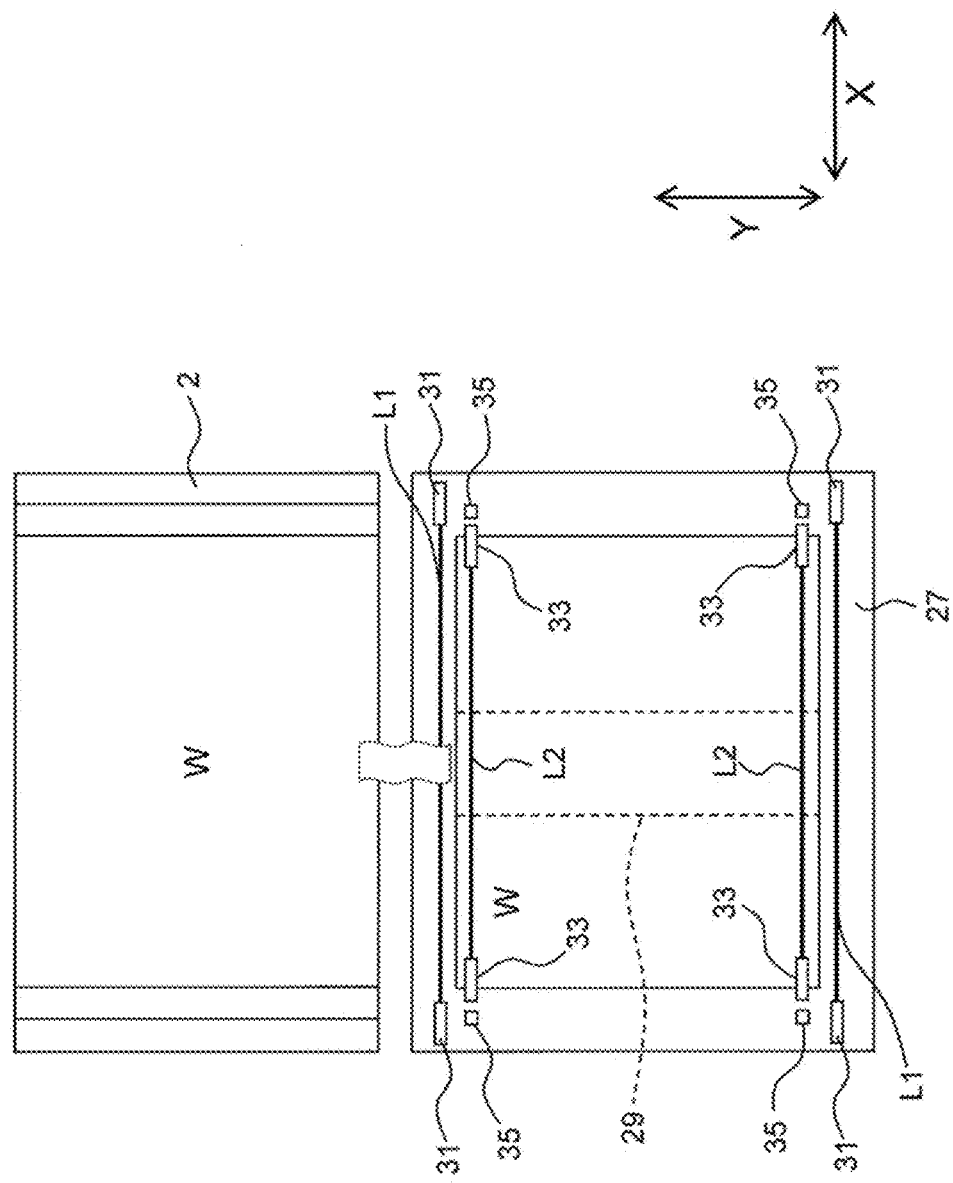

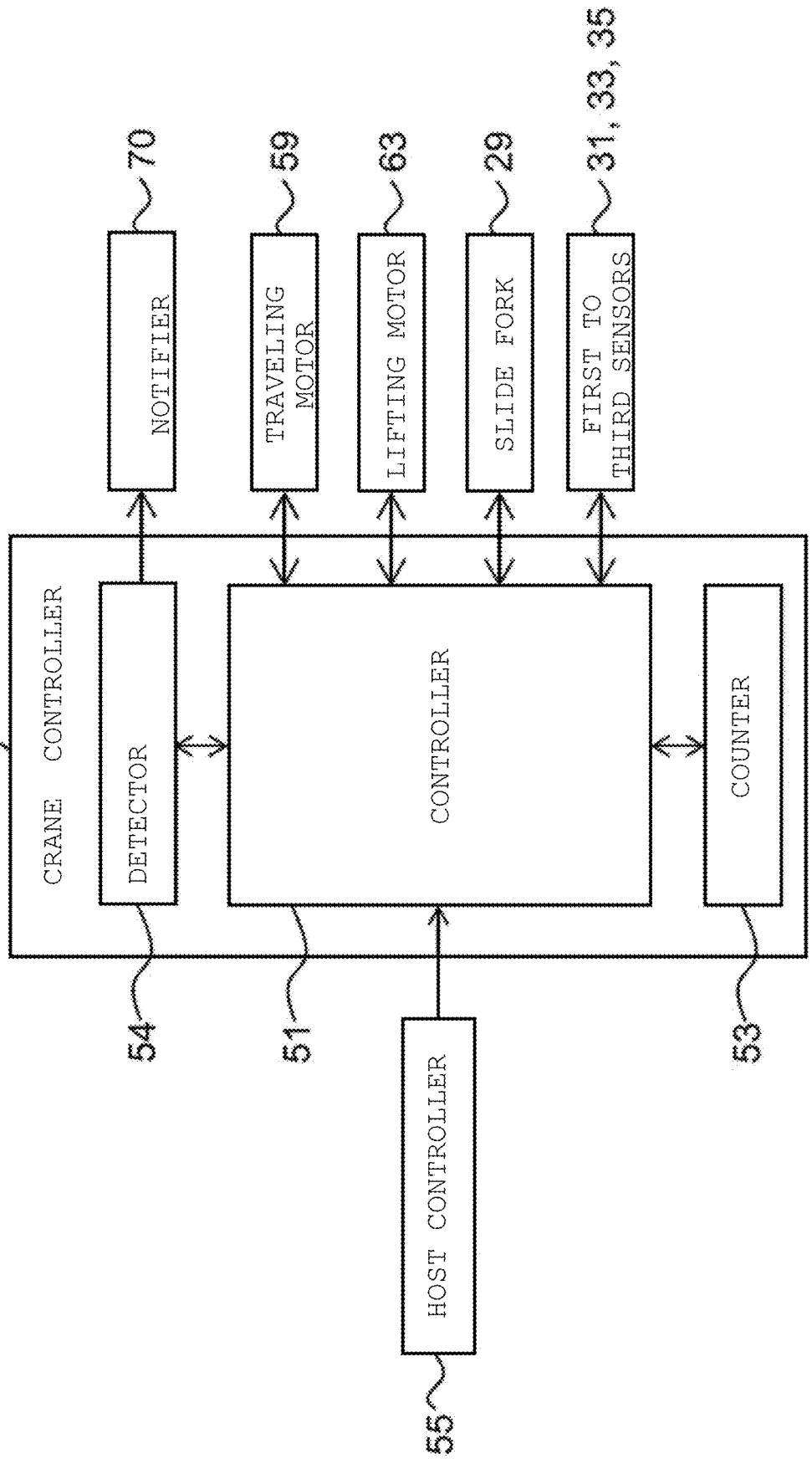

TRANSPORT DEVICE

CROSS REFERENCE TO RELATED APPLICATIONS

This application claims the benefit of priority to Japanese Patent Application No. 2018-148464 filed on Aug. 7, 2018. The entire contents of this application are hereby incorporated herein by reference.

BACKGROUND OF THE INVENTION

1. Field of the Invention

The present invention relates to a transport device for transporting an article, and particularly relates to a transport device including a sensor to detect a state of an article being transported.

2. Description of Related Art

A conventional automated storage includes, for example, a rack and a stacker crane. The rack has a large number of shelves in its length and height. The stacker crane is movable along a longitudinal direction of the rack.

The stacker crane has, for example, a truck frame, a lift stage liftably installed on a mast provided on the truck frame, and a transfer device provided on the lift stage. The lift stage further includes a sensor for detecting an abnormality of an article placed on the transfer device (e.g., see Unexamined Japanese Patent Publication No. 2003-246415).

In the conventional transport device, the above sensor may erroneously detect an article abnormality even though no article abnormality has occurred in the transfer device. A cause of occurrence of the erroneous detection is that the sensor detects a packaging film, a label, or the like of the article, a part of which has been peeled.

As a result, even when an article abnormality has not actually occurred, the transport device comes to an abnormal stop, thus causing a decrease in article transport efficiency.

SUMMARY OF THE INVENTION

Preferred embodiments of the present invention prevent a decrease in transport efficiency due to erroneous detection of an article abnormality by a sensor that detects a state of an article being transported in a transport device including the sensor.

Hereinafter, a plurality of examples of aspects of preferred embodiments of the present invention will be described. These example aspects can be combined in a freely selected manner as required.

A transport device according to one aspect of a preferred embodiment of the present invention is a device for transporting an article. The transport device includes a transporter, a transfer device, an abnormality detector, a counter, and a movement controller.

The transporter moves from a support on which the article is supported to an empty support.

The transfer device is mounted on the transporter and transfers the article to and from the support.

The abnormality detector recognizes an abnormality of the article moved by the movement of the transporter.

The counter counts the number of occurrences of an event related to a problem in transport during execution of one transport command.

When an abnormality is recognized by the abnormality detector, the movement controller reduces a moving speed of the transporter, and when no abnormality is recognized by the abnormality detector upon reduction in the moving speed, the movement of the transporter is continued. In addition, when the number of occurrences of the event counted by the counter reaches a first threshold, the movement controller brings the transport device into an abnormal-stop state.

In the above transport device, when an abnormality is recognized by the abnormality detector, the moving speed of the transporter is reduced and it is then checked whether or not the abnormality is still recognized. This is because a packaging film, a label, and the like of the article, a portion of which has been peeled, may not be recognized by the abnormality detector by reducing the moving speed of the transporter.

When no abnormality is recognized by the abnormality detector as a result of reducing the moving speed of the transporter, it is determined that the abnormality, recognized before the reduction in the moving speed of the transporter, has been recognized erroneously.

As thus described, when the abnormality becomes unrecognized by reduction in the moving speed, the transport of the article is able to be continued, unlike the conventional case. It is thus possible to reduce the probability for occurrence of the abnormal stop due to erroneous detection that is the article abnormality caused by detection of the packaging film, the label, or the like of the article.

That is, it is possible to make a determination of the abnormality stop when an abnormality is recognized by the abnormality detector a plurality of times, instead of immediately making a determination of the abnormal stop. As a result, a decrease in article transport efficiency is prevented.

Further, in the above transport device, the number of occurrences of an event related to a problem in transport is counted, and when the number of occurrences reaches the first threshold, the transporter is brought into the abnormal-stop state. This enables appropriate detection of an article abnormality. Further, this also leads to detection of an abnormality by the abnormality detector.

The movement controller may change a movement condition of the transporter when the number of occurrences counted by the counter exceeds a second threshold smaller than the first threshold.

Accordingly, by changing the movement condition by the time when the number of occurrences of the event related to the problem in transport reaches the first threshold and the transporter is determined to be brought into the abnormal-stop state, it is possible to reduce the possibility for occurrence of the event related to the above erroneous detection and/or problem in transport. Further, it is possible to reduce a mechanical load on the transport device.

The movement controller may change the movement condition of the transporter each time an event related to a problem in transport occurs.

This simplifies the control of the transporter by the movement controller.

The movement controller may bring the transporter into the abnormal-stop state when the abnormality detector recognizes an abnormality while the movement of the transporter is stopped.

In the above case, the abnormality detector is unlikely to erroneously recognize an abnormality. Therefore, when an abnormality is recognized in this case, the transporter is immediately brought into the abnormal-stop state, so that the safety of the transport device is able to be ensured.

The transport device may further include a detector and a notifier.

The detector recognizes the support existing in a vicinity of the transfer device when the number of occurrences is counted by the counter during the movement of the transporter.

The notifier notifies that there is an abnormality in an article supported on the support when the number of times the support on which the article is supported is recognized by the detector exceeds a third threshold while the article is supported on the support.

It is thus possible to specify the support in which an event related to a problem in transport has occurred due to the abnormality in the article.

In addition, by notifying the specific support in which the event related to the problem in transport has occurred, it is possible to recognize the occurrence of the article abnormality (problem in transport) in the specific support.

In a transport device according to a preferred embodiment of the present invention, the movement of the article is continued when the abnormality becomes unrecognized by reduction in the moving speed of the transporter. Hence, the probability for the abnormal stop due to the erroneous detection of the abnormality is able to be lowered to prevent the decrease in article transport efficiency.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7C is a view illustrating an example of a case where the object is detected by transport in a height direction of the article as the article appearance abnormality.

FIG. 7D is a view illustrating an example of a case where it is detected that the object has waved in a Y direction as the article appearance abnormality.

FIG. 7E is a view illustrating an example of a case where the detection of the article appearance abnormality by the object has been resolved.

FIG. 8 is a view illustrating an example of a case where an article appearance abnormality of an article placed on a shelf has been detected.

FIG. 9 is a functional block diagram of a controller of a stacker crane according to a second preferred embodiment of the present invention.

DETAILED DESCRIPTION OF THE PREFERRED EMBODIMENTS

First Preferred Embodiment

Figure 1:
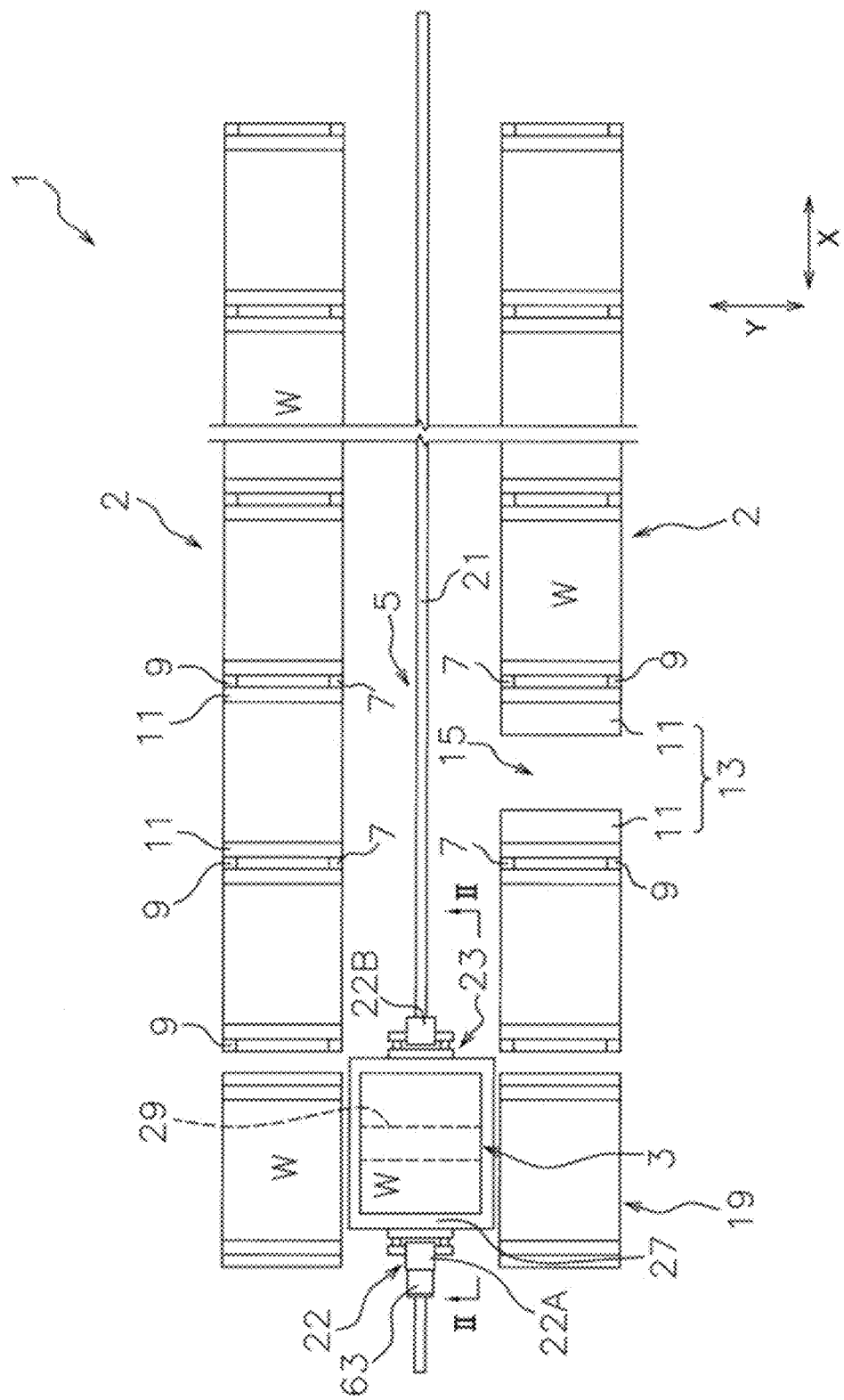
FIG. 1 is a schematic plan view of an automated storage according to a first preferred embodiment of the present invention.
Figure 2:
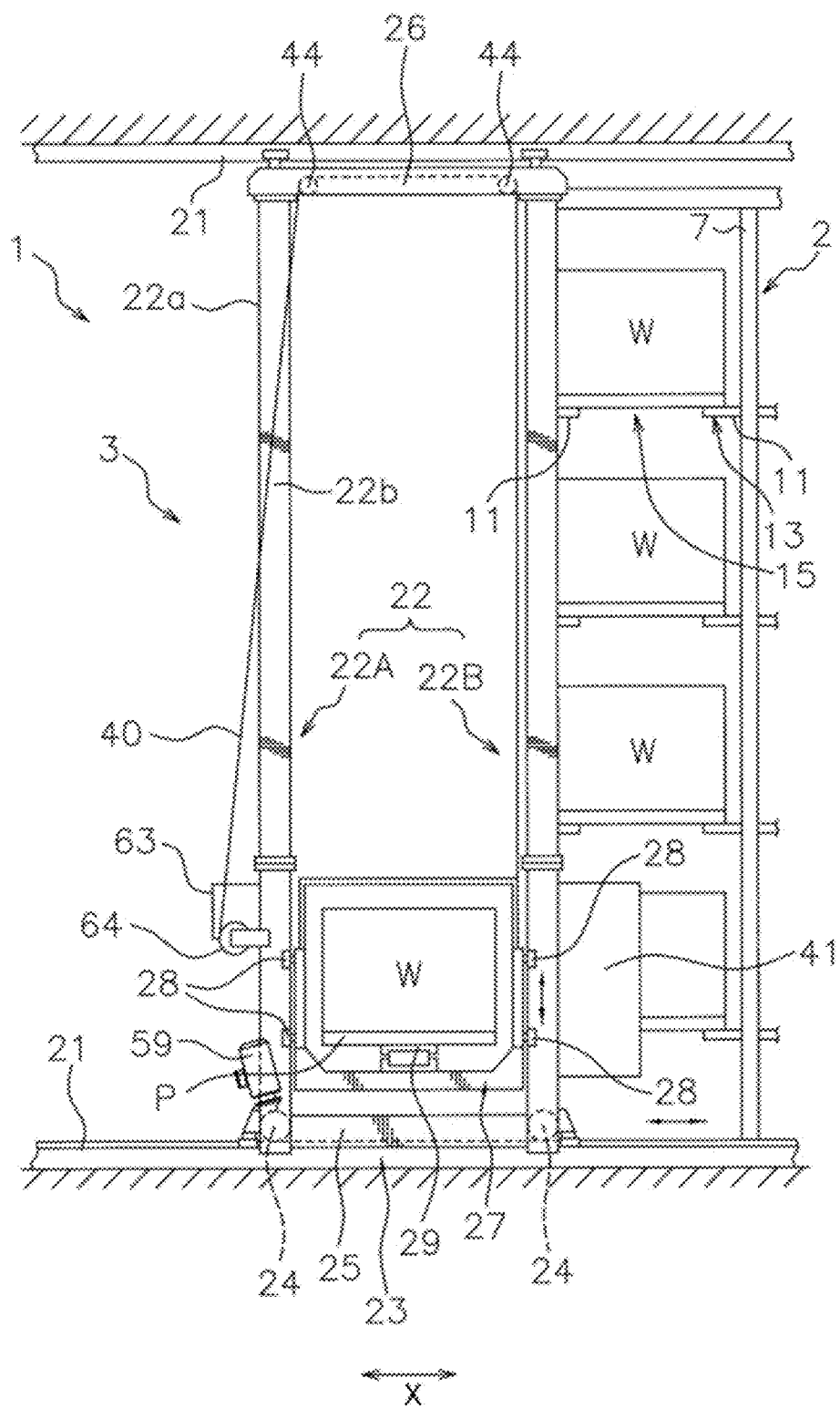
FIG. 2 is a view taken in an arrow direction of II-II in FIG. 1.

With reference to FIGS. 1 and 2, an automated storage 1 according to a first preferred embodiment according to the present invention will be described. FIG. 1 is a schematic plan view of an automated storage according to a first preferred embodiment of the present invention. In this preferred embodiment, a vertical direction in FIG. 1 is a right-left direction (Y direction) of the automated storage 1, and a right-left direction in FIG. 1 is a front-rear direction (X direction) of the automated storage 1.

The automated storage 1 includes a pair of racks 2 and a stacker crane 3 (an example of a transport device).

The pair of racks 2 are disposed so as to sandwich a stacker crane passage 5 extending in the X direction. The rack 2 includes a large number of front columns 7 arranged horizontally at predetermined intervals, rear columns 9 arranged behind the front columns 7 at predetermined intervals from the front columns 7, and a large number of article bearings 11 provided between the front columns 7 and the rear columns 9. A shelf 13 (an example of a support) includes a pair of right and left article bearings 11. As clearly illustrated in the figure, an article W can be placed on each shelf 13. Note that each article W is placed on a pallet P (cf. FIGS. 2 and 3) and moves together with the pallet P. A space between the pair of right and left article bearings 11 is a fork passing gap 15 that allows movement in a height direction of a slide fork 29 described later.

Figure 3:
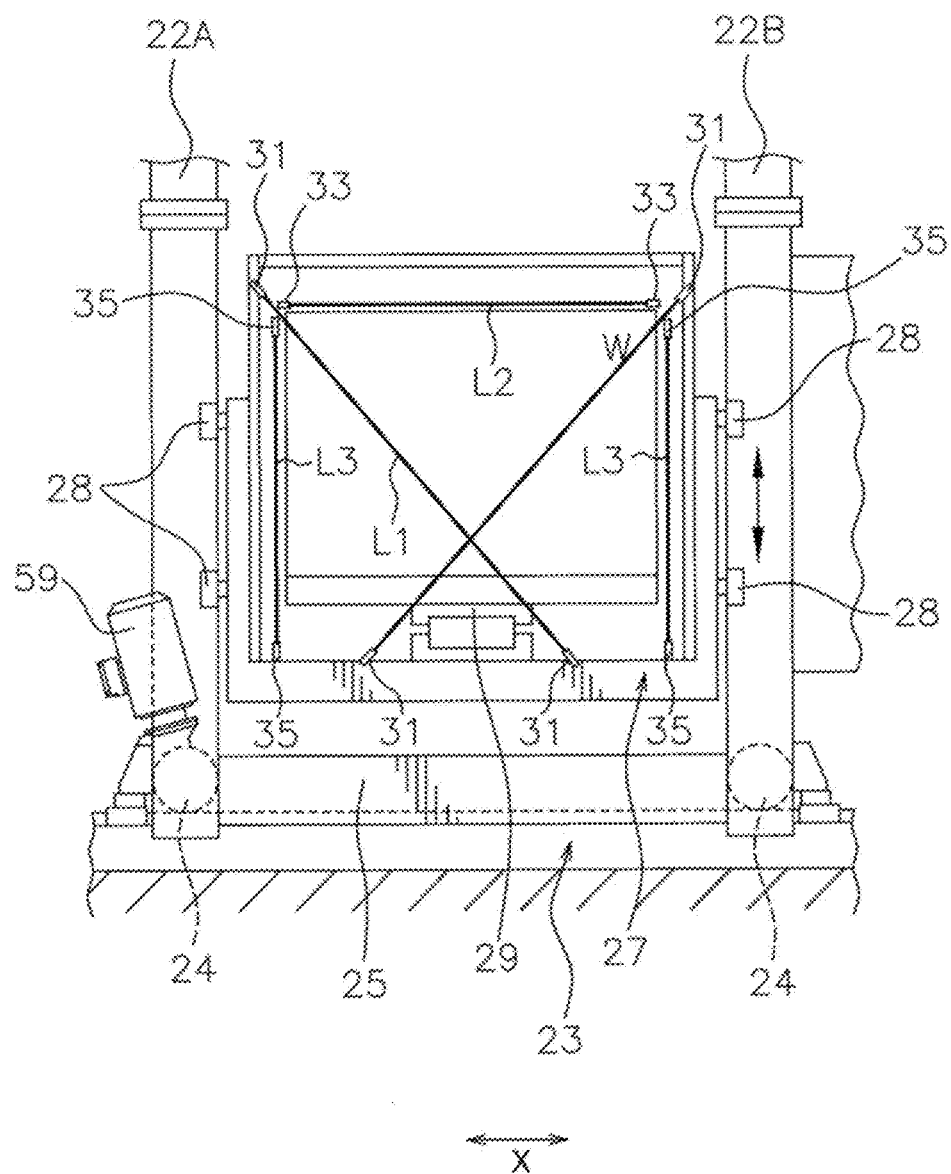
FIG. 3 is an enlarged view of a vicinity of a lift stage.
Figure 4:
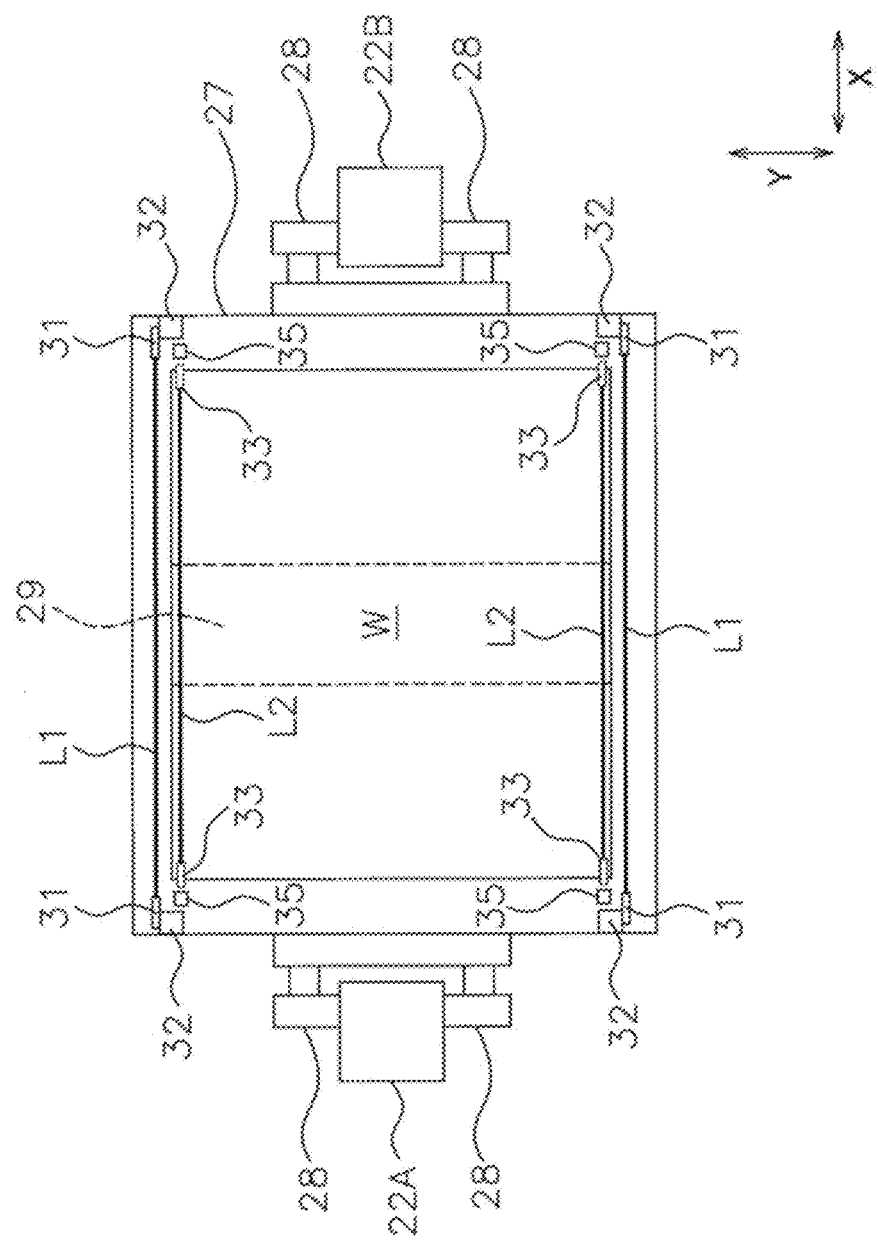
FIG. 4 is a top view of the lift stage.

With reference to FIGS. 2 to 4, the stacker crane 3 will be described. FIG. 2 is a view taken in an arrow direction of II-II in FIG. 1, for explaining the rack and the stacker crane. FIG. 3 is an enlarged view of the vicinity of a lift stage 27. FIG. 4 is a top view of the lift stage 27.

A pair of upper and lower traveling rails 21 are provided along the stacker crane passage 5, and the stacker crane 3 is guided along the traveling rails 21 so as to be movable in the X direction. The stacker crane 3 includes a truck frame 23 including a front mast 22A and a rear mast 22B, which are a pair of masts 22; the lift stage 27 liftably mounted on the front mast 22A and the rear mast 22B; and the slide fork 29 (an example of a transfer device) provided on the table 27 and slidable in the Y direction by an advancing and retracting mechanism (not illustrated). The truck frame 23 includes traveling wheels 24.

The lift stage 27 includes lifting guide rollers 28 guided by the front mast 22A and the rear mast 22B. An upper pair and a lower pair, a total of four, of lifting guide rollers 28 are in contact with one mast. More specifically, the pair of lifting guide rollers 28 are in contact with inner portions in a traveling direction of both side surfaces of the mast 22 in the right-left direction.

In FIG. 2, the pallet P and the article W are placed on the slide fork 29 of the lift stage 27. Lower ends of the front mast 22A and the rear mast 22B are coupled by a lower frame 25, and upper ends of the front mast 22A and the rear mast 22B are coupled by an upper frame 26.

With the above configuration, the stacker crane 3 is able to transport the article W in the X direction by the truck frame 23 traveling in the X direction. Further, the stacker crane 3 is able to transport the article W in the height direction by the lift stage 27 moving up and down along the front mast 22A and the rear mast 22B. That is, the slide fork 29 and the article W are moved by the truck frame 23 and the lift stage 27. Hence, the truck frame 23 and the lift stage 27 are collectively referred to as a "transporter".

As illustrated in FIGS. 3 and 4, the lift stage 27 is provided with two pairs of first sensors 31, a pair of second sensors 33, and two pairs of third sensors 35 (an example of an abnormality detector).

One of the two pairs of first sensors 31 is provided at a first end in the Y direction of the lift stage 27 (in FIG. 4, a lower end in the drawing). The pair of first sensors 31 is parallel to the X direction at the first end in the Y direction of the lift stage 27, and emits and receives a first light L1 in a diagonal direction of the article W in the height direction.

In addition, the other pair of the two pairs of first sensors 31 is provided at a second end in the Y direction of the lift stage 27 (in FIG. 4, an upper end in the drawing). The other pair of first sensors 31 is parallel to the X direction at the second end in the Y direction of the lift stage 27, and emits and receives the first light L1 in the diagonal direction of the article W in the height direction.

When the first sensor 31 does not receive the first light L1, it is determined that the article W has blocked the first light L1, and it is possible to detect that the article W in the Y direction has shifted. As the first sensor 31, for example, a photoelectric sensor is able to be used.

The pair of second sensors 33 are attached at positions slightly above the upper end of the article W placed on the slide fork 29, at both ends in the Y direction of the lift stage 27. The second sensor 33 is, for example, a photoelectric sensor, and emits and receives a second light L2 in the horizontal direction at a position slightly above the upper end of the article W.

When the second sensor 33 does not receive the second light L2, it is determined that the article W has blocked the second light L2, and it is possible to detect that the height of the article W is excessive.

One of the two pairs of third sensors 35 is attached, with an interval slightly wider than a width in the X direction of the article W placed on the slide fork 29, at the first end in the Y direction of the lift stage 27. Each of the pair of the third sensors 35 is, for example, a photoelectric sensor, and emits and receives a third light L3 in the height direction at the first end in the Y direction of the lift stage 27.

The other pair of the second pairs of third sensors 35 is attached, with an interval slightly wider than a width in the X direction of the article W placed on the slide fork 29, at the second end in the Y direction of the lift stage 27. Each of the other pair of the third sensors 35 is, for example, a photoelectric sensor, and emits and receives the third light L3 in the height direction at the second end of the lift stage 27 in the Y direction.

When the third sensor 35 does not receive the third light L3, it is determined that the article W has blocked the third light L3, and it is possible to detect that the article W has shifted in the X direction.

With the first sensor 31 to the third sensor 35 having the above configuration, it is possible to recognize the abnormality of the article W moved by the movement of the transporter. Concerning the first sensor 31 to the third sensor 35 described above, the first sensor 31 is used to detect article protrusion of the article W. The second sensor 33 and the third sensor 35 are used to detect an article collapse. That is, in the present preferred embodiment, the "article abnormality" means an article appearance abnormality. The article appearance abnormality refers to a state in which the article W in an assumed article appearance is placed at a position different from a previously defined predetermined position. More specifically, in the present preferred embodiment, the "article abnormality" means article protrusion or article collapse of the article W.

As illustrated in FIG. 2, the stacker crane 3 includes a control panel 41, a traveling motor 59, and a lifting motor 63. The control panel 41 is provided on the rear mast 22B at a position opposite to the front mast 22A with respect to the rear mast 22B in the traveling direction. The traveling motor 59 is provided on the front mast 22A. The lifting motor 63 is provided on the front mast 22A.

The control panel 41 includes therein electric equipment such as an inverter, a converter, and a breaker for the traveling motor 59 and the lifting motor 63. The control panel 41 further includes a control panel box (not illustrated). The control panel 41 includes a frame that covers the electrical equipment. The control panel 41 is connected to each of a power source (not illustrated), the traveling motor 59, the lifting motor 63, the slide fork 29, and the like via a power cable (not illustrated). The control panel 41 is further connected to each of a ground control panel, the sensors, the slide fork 29, and a control power source via a control cable and a communication interface.

As illustrated in FIG. 2, the lifting motor 63 is able to drive a drum 64. A wire 40 extends from the drum 64. The wire 40 is wound around a roller 44 provided on the upper frame 26 and is further coupled to the lift stage 27.

Figure 5:
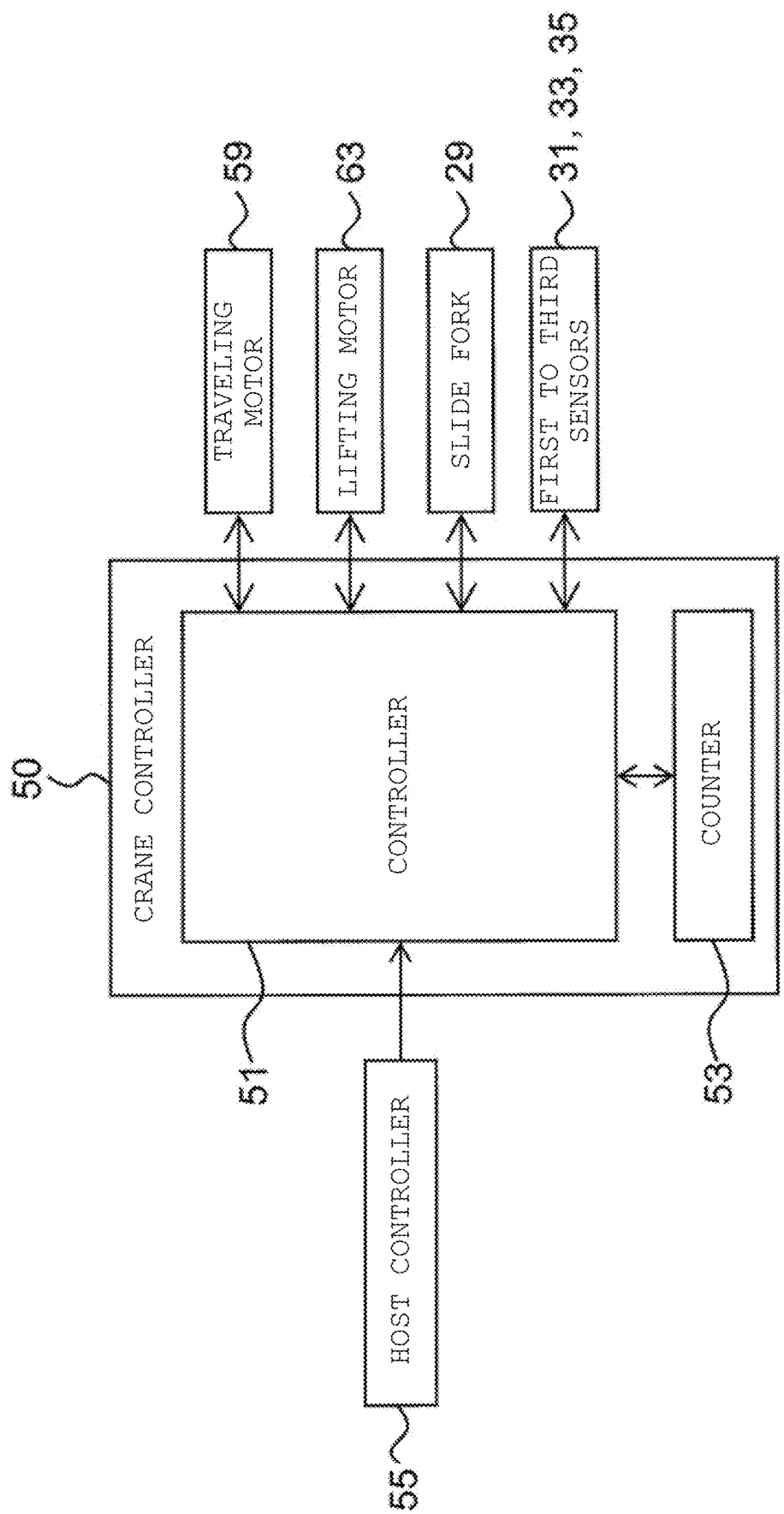
FIG. 5 is a functional block diagram of a controller of a stacker crane according to the first preferred embodiment of the present invention.

With reference to FIG. 5, a crane controller 50 disposed in a control panel box (not illustrated) will be described. FIG. 5 is a functional block diagram of a controller of a stacker crane according to the first preferred embodiment.

The crane controller 50 is mounted in the stacker crane 3 and is capable of communicating with a host controller 55 that controls the entire automated storage 1.

The crane controller 50 preferably is a computer including computer hardware such as a central processing unit (CPU) and a memory. The elements shown in FIG. 5 are represented as functional blocks realized preferably by cooperation of computer hardware and software, for example. Note that these controllers may be achieved by respective single computers.

Alternatively, the functional blocks may each be defined by hardware, for example. In addition, the crane controller 50 is not restricted to the one mounted on the truck frame 23 and may be disposed on the ground side in an electrically connected state.

The crane controller 50 includes a main controller 51 (an example of a movement controller) and a counter 53.

The main controller 51 is configured or programmed to control the transport and transfer of the article W. Specifically, the main controller 51 has a function of controlling the drive of the traveling wheels 24 of the truck frame 23 and is connected to the traveling motor 59. The main controller 51 is configured or programmed to vertically move the lift stage 27 along the front mast 22A and the rear mast 22B, and is connected to the lifting motor 63. The main controller 51 is configured or programmed to expand and contract the slide fork 29 in the Y direction, and is connected to a transfer motor (not illustrated).

The main controller 51 is configured or programmed to detect an article collapse or article protrusion of the article W placed on the slide fork 29, and is connected to the first sensor 31 to the third sensor 35.

During the transportation of an article W by the transporter, if a problem in transport, such as an article collapse or an article protrusion, is detected, the moving speed of the transporter carrying the article W is reduced or stopped.

When the abnormality (problem in transport) is no longer recognized after the moving speed of the transporter has been reduced or stopped, the movement of the transporter is continued. The counter 53 is configured or programmed to count the number of occurrences of an event related to a problem in transport. To do this, in the present preferred embodiment, the counter 53 counts the number of times an article collapse or an article protrusion of the article W is no longer detected after the moving speed of the transporter (the truck frame 23 and/or the lift stage 27) is reduced or stopped in response to the article collapse or the article protrusion being detected during movement of the transporter. In the present preferred embodiment, the number of times the article collapse or the article protrusion of the article W becomes undetected after reducing the moving speed of the transporter, or stopping the transporter, when the article collapse or the article protrusion of the article W is detected during movement, is designated as the number of occurrences of the event related to a problem in transport.

As an alternative preferred embodiment of the present invention, the number of times the first sensor 31 to the third sensor 35 detect the article collapse or the article protrusion of the article W may be set as the number of occurrences of the event related to the problem in transport.

The moving speed includes the traveling speed of the truck frame 23 in the X direction, and/or the lifting speed of the lift stage 27 in the height direction. For example, while transporting the article W by the transport device such as the stacker crane 3, the moving speed is able to be defined as the traveling speed of the truck frame 23 in the X direction, and/or the lifting speed of the lift stage 27 in the height direction.

The host controller 55 preferably is a computer system including computer hardware such as a CPU and a memory. The host controller 55 controls the entire automated storage 1, and outputs a transfer command to transfer the article W to the stacker crane 3.

Figure 6:
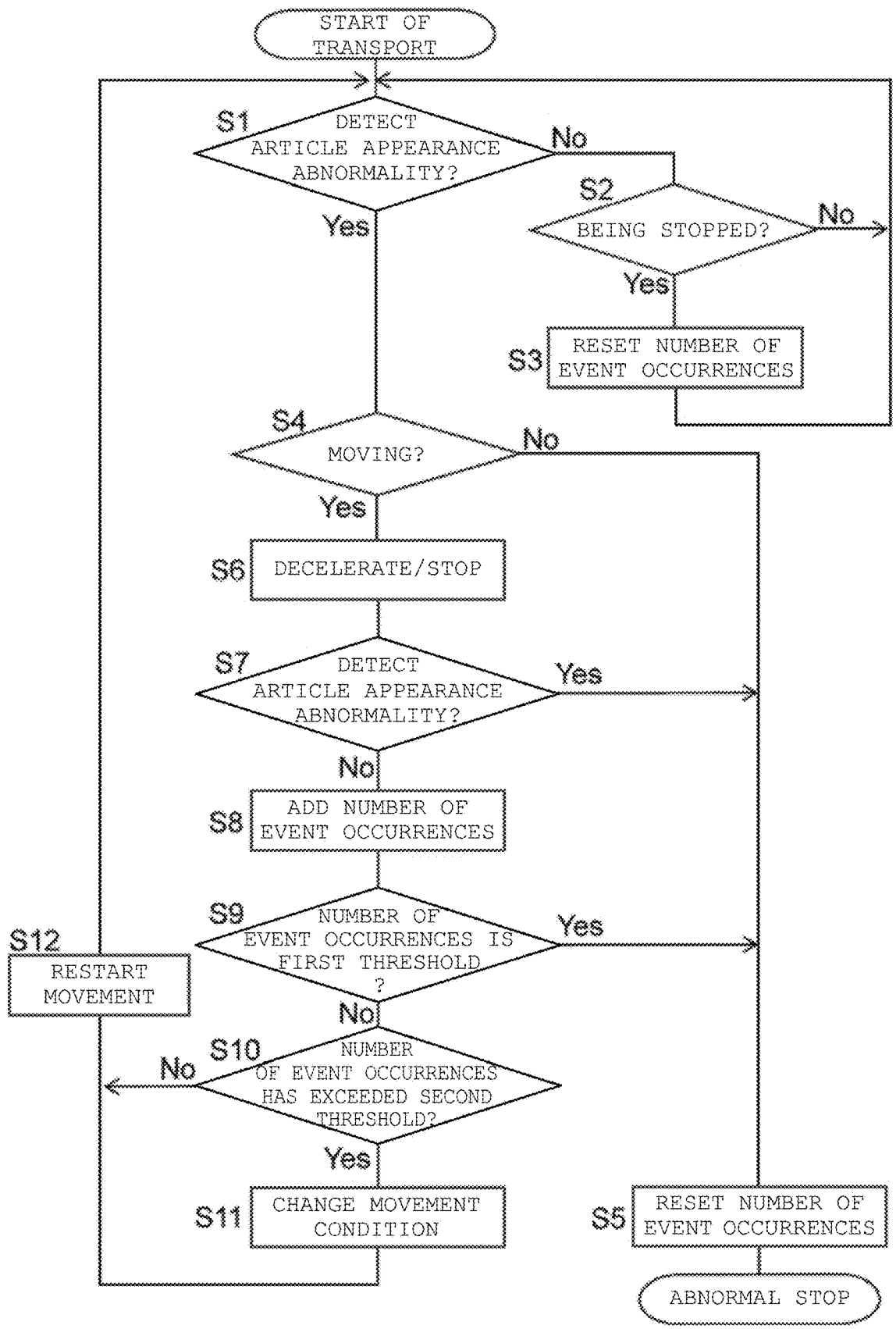
FIG. 6 is a flowchart illustrating an article transporting operation by the stacker crane.

An operation of transporting the article W by the stacker crane 3 according to the first preferred embodiment will be described with reference to FIG. 6. FIG. 6 is a flowchart illustrating the operation of transporting the article W by the stacker crane 3.

In the following description, the number of times the article collapse or the article protrusion of the article W is no longer detected after reducing the moving speed of the transporter, or stopping the transporter, is counted as the number of occurrences of the event (referred to as the number of event occurrences) related to the problem in transport.

Also, in the following, an operation in the case of executing one transport command received from the host controller 55 will be described as an example.

When a transport command is received from the host controller 55, the article W is transported from the shelf 13 on which the article W is supported to the lift stage 27. Thereafter, the transport of the article W to the empty shelf 13 by the truck frame 23 and/or the lift stage 27 is started.

When the transport of the article W is started, the main controller 51 determines whether or not an article appearance abnormality (article collapse and/or article protrusion of the article W) has been detected in step S1.

When any of the first light L1 to the third light L3 is not received by the corresponding first sensor 31 to the third sensor 35, the main controller 51 determines that the article appearance abnormality has been detected.

When the article appearance abnormality has not been detected ("No" in step S1), the main controller 51 checks the operation being performed by the stacker crane 3 in step S2.

When the transport or transfer of the article W is not being performed ("Yes" in step S2), the counter 53 resets the number of event occurrences. That is, when the transfer of the transported article W to the shelf 13 is completed, the number of event occurrences is reset. Thereafter, the transport process of the article W returns to step S1, and the current operation is continued.

When the transport or transfer of the article W is performed ("No" in step S2), the transport process of the article W returns to step S1. That is, when the article appearance abnormality is not detected and the article W is being transported or transferred, the main controller 51 does not reset the number of event occurrences and continues to execute the current operation.

On the other hand, when the article appearance abnormality is detected during the transport of the article W ("Yes" in step S1), the main controller 51 executes a process for the detection of the article appearance abnormality. As this process, there is executed a process of determining whether or not to bring the stacker crane 3 into an abnormal-stop state after determining whether or not the detection of the article appearance abnormality is an erroneous detection.

The above "abnormal-stop state" means a state in which the operation of the stacker crane 3 cannot be resumed unless the user cancels the abnormal-stop state.

That is, the stacker crane 3 is not brought into the abnormal-stop state immediately after detection of the article appearance abnormality. The movement of the transporter is stopped once, and when the article appearance abnormality is not detected due to the stop, the movement of the transporter is resumed without bringing the stacker crane 3 into the abnormal-stop state. The stacker crane 3 is brought into the abnormal-stop state only when the stop and restart of the movement of the transporter are repeated a predetermined number of times.

This eliminates the need to reset an abnormal stop due to occurrence of the abnormality stop each time detection of an article appearance abnormality including an erroneous detection occurs, so that it is possible to avoid a decrease in transport efficiency.

Specifically, first, it is determined whether or not the stacker crane 3 can currently cause an erroneous detection of an article appearance abnormality. Here, with reference to FIGS. 7A to 7D, a description will be given of a case where the article appearance abnormality is detected by the first sensor 31 to the third sensor 35. When the article appearance abnormality is detected by the first sensor 31 to the third sensor 35, for example, there is a case where the article W includes a plurality of small articles (i.e., the article W is a collection of a plurality of small articles) and some of the small articles move, which causes detection of the article collapse (see FIG. 7A). There is also a case where an object B (a film, a label, etc.), peeled from the article W, is detected by blocking the third light L3 when the article W is being transported in the X direction (see FIG. 7B). There is further a case where the object B is detected by blocking the second light L2 when the article W is being transported in the height direction (see FIG. 7C). There is further a case where the object B is detected by waving in the Y direction and blocking the first light L1 (see FIG. 7D).

Note that each of FIGS. 7A to 7D merely illustrates the case where the first sensor 31 to the third sensor 35 detect the article appearance abnormality, and erroneous detection may occur in other cases.

Figure 7A:
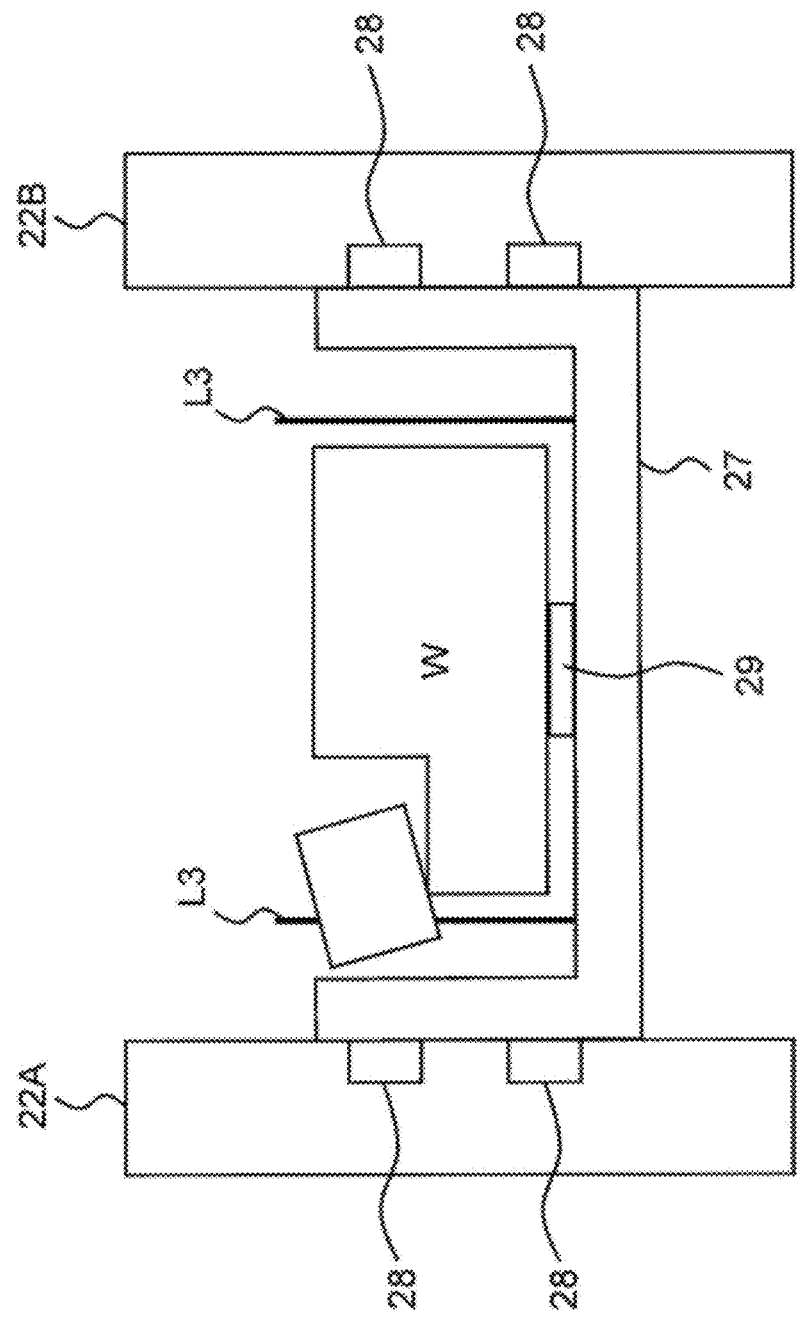
FIG. 7A is a view illustrating an example of a case where an article collapse is detected as an article appearance abnormality.
Figure 7B:
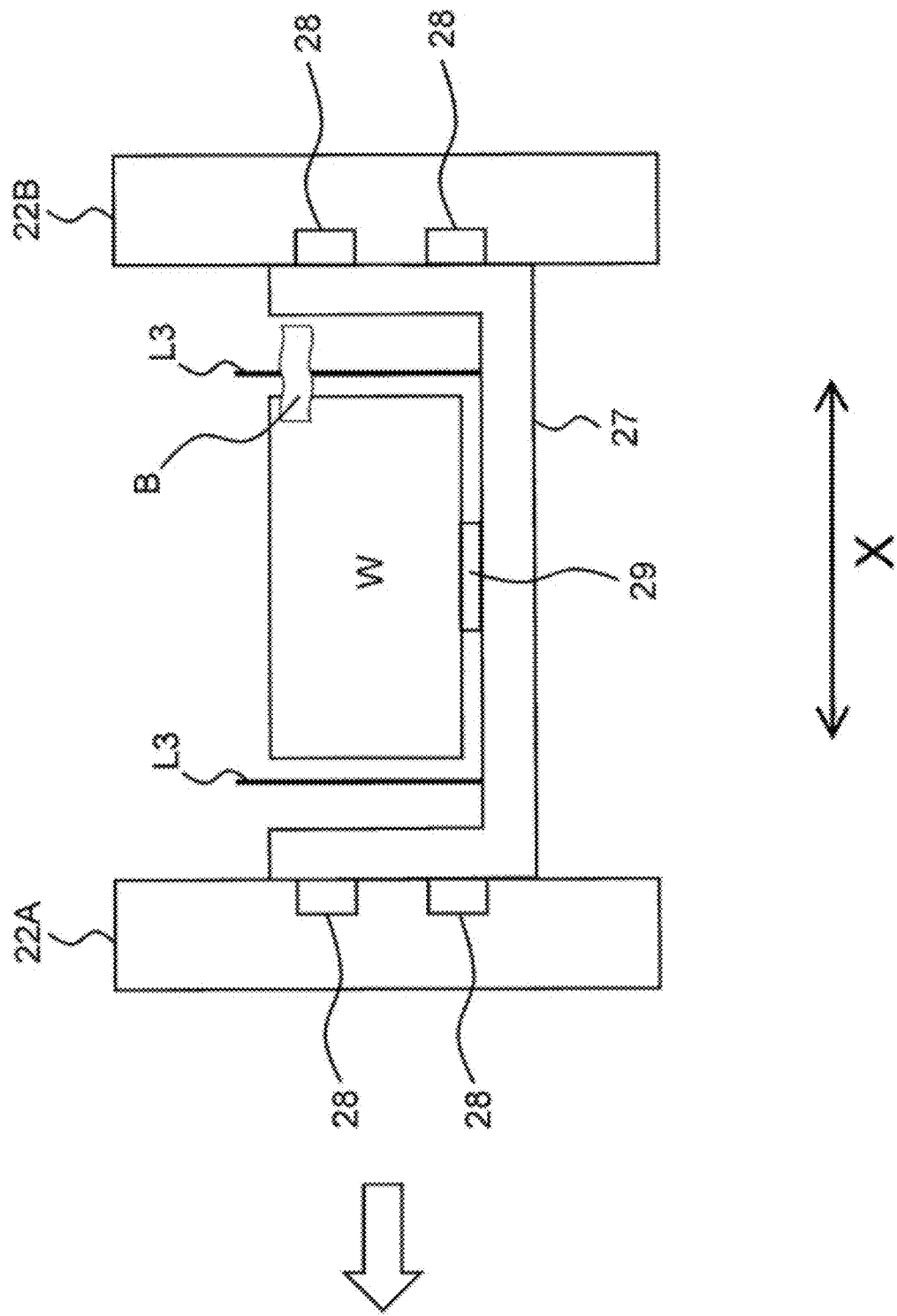
FIG. 7B is a view illustrating an example of a case where an object is detected by the transport of an article in an X direction as the article appearance abnormality.

Among the above, what should be detected as the article appearance abnormality is the article collapse illustrated in FIG. 7A, and not the object B peeled from the article W illustrated in FIGS. 7B to 7D.

The erroneous detection of the article appearance abnormality due to the object B peeled from the article W occurs due to the object B waving in the wind during the movement of the transporter. That is, the erroneous detection of the article appearance abnormality is likely to occur during the movement of the transporter.

Therefore, the main controller 51 determines whether or not the erroneous detection of the article appearance abnormality is likely to occur, (the likelihood of an erroneous detection of the article appearance abnormality) based on whether or not the transporter is currently being moved in step S4.

When the movement of the transporter is not currently performed ("No" in step S4), for example, while the stacker crane 3 is stopped or when the transfer of the article W is being performed, it is determined that the erroneous detection of the article appearance abnormality is unlikely to occur.

In this case, the main controller 51 determines that the present detection of the article appearance abnormality is due to the article collapse/article protrusion, and proceeds to the process of step S5. That is, the number of event occurrences is reset, and the stacker crane 3 is brought into the abnormal-stop state.

On the other hand, when the movement of the transporter is currently executed ("Yes" in step S4), the main controller 51 determines whether or not the present detection of the article appearance abnormality has actually been detection of the article collapse/article protrusion.

The waving of the object B peeled from the article W becomes weaker by stopping the transport of the article W or reducing the transport speed. That is, the object B peeled from the article W is drawn toward the article W again. Hence, the erroneous detection of the article appearance abnormality due to the object B illustrated in FIGS. 7B to 7D may be resolved as illustrated in FIG. 7E by the above operation.

On the other hand, the detection of the article appearance abnormality (the article collapse/article protrusion) illustrated in FIG. 7A is unlikely to be resolved even when the transport of the article W is stopped or the transport speed is reduced.

Therefore, in step S6, the main controller 51 either stops the transporter or reduces the moving speed so as to resolve the present detection of the article appearance abnormality. When the moving speed is reduced in step S6, and when the article appearance abnormality becomes undetected during the reduction, the movement of the transporter may be resumed. This enables quick recovery from the erroneous detection.

Further, in addition to the above, when no article appearance abnormality is detected for a predetermined time after the start of reduction in the moving speed, the movement of the transporter may be resumed. This avoids repeated movement and restart of the transporter.

Moreover, at a stage where the moving speed is reduced to a predetermined speed, it may be checked whether or not the article appearance abnormality is detected. This makes it possible to simplify the process of determining the erroneous detection of the article appearance abnormality.

In the present preferred embodiment, the transporter is stopped in step S6. Thus, the above object B hardly waves, and the erroneous detection is able to be resolved more reliably. In addition, the safety of the automated storage 1 is able to be ensured more reliably.

Thereafter, in step S7, the main controller 51 determines whether or not the article appearance abnormality has been detected while the transporter is stopped.

When the article appearance abnormality is detected ("Yes" in step S7), the main controller 51 determines that the present detection of the article appearance abnormality is detection of the article collapse, and executes the process of step S5. That is, the number of event occurrences is reset, and the stacker crane 3 is brought into the abnormal-stop state.

On the other hand, when the article appearance abnormality is not detected ("No" in step S7), the main controller 51 determines that the present detection of the article appearance abnormality is the erroneous detection. At this time, the main controller 51 instructs the counter 53 to add the number of event occurrences.

In step S8, the counter 53 having received this command increases the number of event occurrences by one.

Thereafter, in step S9, the main controller 51 checks whether or not the number of event occurrences has reached a first threshold.

When the number of event occurrences reaches the first threshold ("Yes" in step S9), the main controller 51 executes the process of step S5 so as to investigate the cause and the like of the erroneous detection of the article appearance abnormality (such as the waving of the object B). That is, the number of event occurrences is reset, and the stacker crane 3 is brought into the abnormal-stop state.

On the other hand, when the number of event occurrences is smaller than the first threshold ("No" in step S9), the main controller 51 determines to resume the movement of the transporter.

In the present preferred embodiment, at the time of resuming the movement, movement conditions are changed to reduce the possibility for the occurrence of the erroneous detection of the article appearance abnormality. The movement conditions to be changed are the moving speed, acceleration, and deceleration of the transporter. As described above, the erroneous detection of the article appearance abnormality may be resolved by stopping the movement of the transporter or reducing the moving speed. Hence in the present preferred embodiment, the moving speed of the transporter is reduced more than usual, and the movement of the transporter is resumed.

In addition, by repeating the stop and restart of movement of the transporter, acceleration and deceleration of the truck frame 23 and/or the lift stage 27 are repeated. The repetition of this acceleration and reduction causes stress to act on each portion of the stacker crane 3 many times, which may cause a failure. Since the stress acting on the object is proportional to the acceleration/deceleration, in the present preferred embodiment, the acceleration at the time of restarting the transport of the article W and the deceleration at the time of reducing the speed again are also reduced.

However, a frequent change in movement condition, particularly reduction in the moving speed, causes a decrease in transport efficiency of the article W, so that the movement condition is changed when the number of event occurrences exceeds a second threshold smaller than the first threshold.

That is, after determining to resume the movement of the transporter, the main controller 51 determines whether or not the number of event occurrences has exceeded the second threshold smaller than the first threshold in step S10.

When the number of event occurrences is equal to or smaller than the second threshold ("No" in step S10), the main controller 51 resumes the movement of the transporter without changing the current movement condition in step S13.

On the other hand, when the number of event occurrences exceeds the second threshold ("Yes" in step S10), the main controller 51 changes the current movement condition in step S11. For example, the traveling speed and/or acceleration/deceleration of the truck frame 23 are reduced. Further, the lifting speed and/or acceleration/deceleration speed of the lift stage 27 are reduced. The change may be made on the movement conditions of only one, or both, of the truck frame 23 and the lift stage 27.

Thereafter, in step S12, the movement of the transporter is resumed under the changed movement conditions.

As an alternative preferred embodiment of the change in movement condition, a plurality of thresholds may be provided as the threshold of the number of event occurrences for changing the movement condition.

As one alternative preferred embodiment of the present invention, the movement condition may be changed once every predetermined number of event occurrences. For example, the movement condition may be changed stepwise once every two occurrences of the event, such as changing the movement condition when the movement restart of the transporter occurs twice, four times, or other times.

As another alternative preferred embodiment of the present invention, the movement condition may be changed at any number of event occurrences. For example, the movement condition may be changed stepwise in response to an increase of any number of event occurrences, such as changing the movement condition when the movement restart of the transporter occurs once, twice, five times, or other times.

As still another alternative preferred embodiment of the present invention, the threshold for changing the moving speed of the transporter and the threshold for changing the acceleration/deceleration may be made different from each other. For example, the moving speed may be reduced at the second occurrence of the event, and the acceleration/deceleration of the transporter may be decreased at the third occurrence of the event.

Second Preferred Embodiment

In the first preferred embodiment, the article appearance abnormality of the article W being transported by the stacker crane 3 has been detected using the first sensor 31 to the third sensor 35. In addition to this, the first sensor 31 to the third sensor 35 may be able to detect an article appearance abnormality of the article W placed on the shelf 13. For example, as illustrated in FIG. 8, a portion of the packaging film and/or the label of the article W placed on the shelf 13 has been peeled, and the film and the like waves by movement of the transporter. Then, when the first light L1 is blocked by the film or the like, an article appearance abnormality is detected.

FIG. 8 is a view illustrating an example of the case where the article appearance abnormality of the article W placed on the shelf 13 has been detected.

Hereinafter, the detection of the article appearance abnormality of the article W in the specific shelf 13 of the rack 2 according to the second preferred embodiment will be described. First, a configuration of a crane controller 50 according to the second preferred embodiment will be described with reference to FIG. 9. FIG. 9 is a functional block diagram of a controller of a stacker crane according to the second preferred embodiment of the present invention.

In the second preferred embodiment, only the configuration and function of the crane controller 50 are different from those of the first preferred embodiment, and the other configurations and functions are the same as those of the first preferred embodiment. Therefore, descriptions of the configurations and functions except for those of the crane controller 50 will be omitted.

Figure 10:
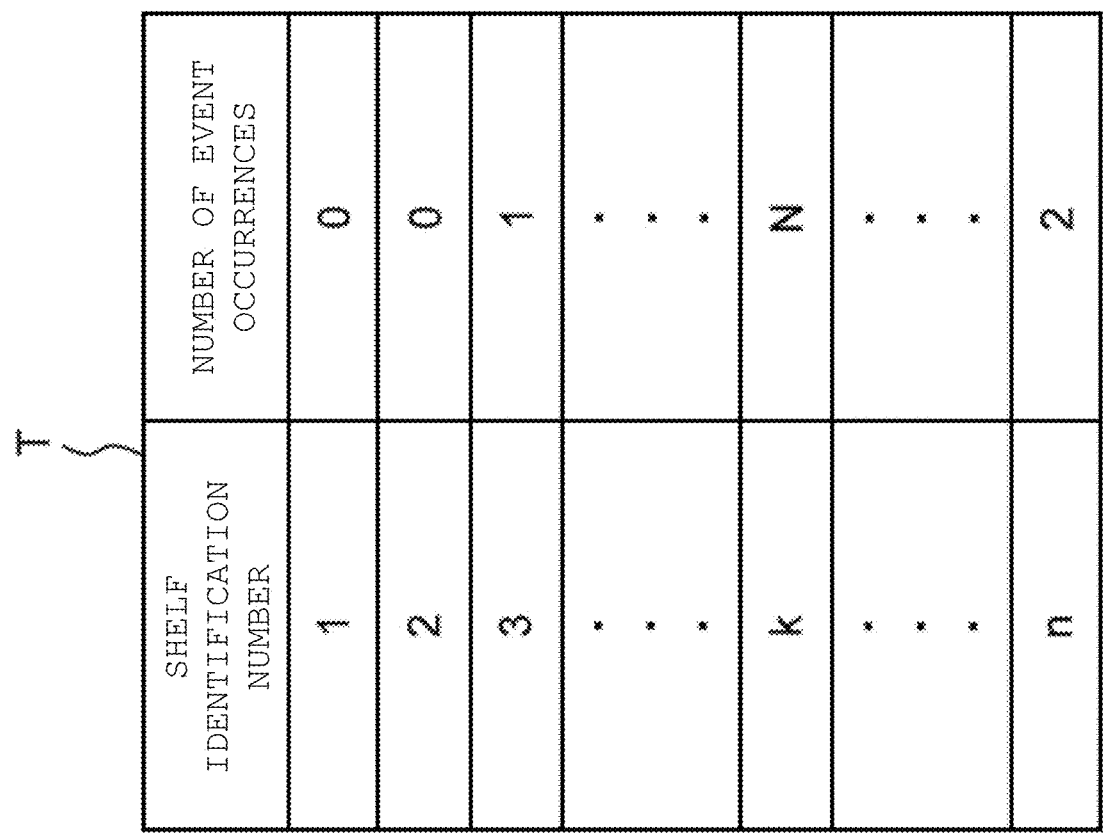
FIG. 10 is a diagram illustrating an example of an event occurrence shelf table.

As illustrated in FIG. 9, the crane controller 50 according to the second preferred embodiment further includes a detector 54. The detector 54 records, for each article W placed on the shelf 13, the number of times the shelf 13, on which the article W is placed, is perceived as an event occurrence shelf. For example, the shelf 13 is "perceived as an event occurrence shelf" when the shelf 13 is present in a vicinity of the slide fork 29 that is mounted on the lift stage 27, when the article appearance abnormality is detected by the first sensor 31 to the third sensor 35. The detector 54 records the number of times the shelf 13 is perceived as an event occurrence shelf in an event occurrence shelf table T as illustrated in FIG. 10. FIG. 10 is a diagram illustrating an example of an event occurrence shelf table.

At the time of perceiving the event occurrence shelf, the detector 54 determines which side of the stacker crane passage 51, that the shelf 13, perceived as the event occurrence shelf, of the rack 2, is disposed. The side of the stacker crane passage 5 that the event occurrence shelf is disposed is determined bar which side of the lift stage 27 the first sensor 31 to the third sensor 35 having detected the article appearance abnormality are arranged.

Here, the shelf 13 being "perceived as the event occurrence shelf" means that the removed shelf 13, present in a vicinity of the slide fork 29 mounted on the lift stage 27, is perceived as the event occurrence shelf when the article appearance abnormality is detected by the first sensor 31 to the third sensor 35.

Specifically, information identifying the shelf 13 of the rack 2 (in FIG. 10, identification numbers (1, 2, . . . k, n) of the shelf 13) and the number of event occurrences on each shelf 13 are associated and stored. In the example illustrated in FIG. 10, the shelf 13 with the number of event occurrences being 1 or more is the event occurrence shelf.

In addition, when the article W no longer exists on the shelf 13 that was previously determined to be the event occurrence shelf, the detector 54 resets (sets to 0) the number of event occurrences associated with the identification number of the corresponding shelf 13 in the event occurrence shelf table T.

As illustrated in FIG. 9, the detector 54 is connected to the notifier 70. The notifier 70 notifies that there is an abnormality in the article W supported on the event occurrence shelf when the number of times the event occurrence shelf on which the article W is supported is recognized by the detector 54 exceeds a third threshold while the article W is supported on the event occurrence shelf. The notifier 70 is, for example, a display that displays various pieces of information.

The determination as to whether or not there is an abnormality in the article W placed on the specific event occurrence shelf and the notification thereof are performed as follows.

In the flowchart described in FIG. 6, for example, in step S7, the main controller 51 instructs the counter 53 to add the number of event occurrences. At this time, the identification number of the shelf 13 present in the vicinity of the slide fork 29 is output to the detector 54 when the article appearance abnormality is detected in step S1.

In step S8, the detector 54 that has received the identification number increases the number of event occurrences associated with the identification number received in the event occurrence shelf table T by one.

In another preferred embodiment of the present invention, when it is determined in the step S1 of the flowchart of FIG. 6 whether or not the article appearance abnormality has been detected, the identification number of the shelf 13 existing in the vicinity of the slide fork 29 at the time of detection of the article appearance abnormality may be output to the detector 54.

After that, the detector 54 specifies an event occurrence shelf associated with one exceeding the third threshold among the number of event occurrences stored in the event occurrence shelf table T as an event occurrence shelf with the article W having an abnormality. In the example of the event occurrence shelf table T illustrated in FIG. 10, for example, a shelf with an identification number "k" (the number of event occurrences: N) is specified as the event occurrence shelf with the article W having an abnormality.

The detector 54 instructs the notifier 70 to notify that the article W placed on the specified event occurrence shelf has an abnormality. The notifier 70 having received the command notifies the shelf 13 in which the abnormality has occurred in the article W by displaying information (e.g., the identification number) related to the shelf 13 in which the abnormality has occurred in the article W.

The first and second preferred embodiments have the following effects.

The stacker crane 3 (an example of the transport device) according to each of the first preferred embodiment and the second preferred embodiment includes the truck frame 23 and/or the lift stage 27 (an example of the transporter), the slide fork 29 (an example of the transfer device), the first sensor 31 to the third sensor 35 (an example of the abnormality detector), the counter 53, and the main controller 51 (an example of the movement controller).

The truck frame 23 and/or the lift stage 27 move from the shelf 13 (an example of the support) on which the article W is supported to the empty shelf 13.

The slide fork 29 is mounted on the lift stage 27 and transfers the article W to and from the shelf 13.

The first sensor 31 to the third sensor 35 recognize an abnormality of the article W moved by the movement of the transporter.

The counter 53 counts the number of event occurrences (an example of the number of occurrences of an event related to a problem in transport) during execution of one transport command.

When an abnormality is recognized by the first sensor 31 to the third sensor 35, the main controller 51 reduces the moving speed of the transporter, and when the abnormality is no longer recognized by the first sensor 31 to the third sensor 35 after the moving speed has been reduced, the movement of the transporter is continued.

Further, when the number of event occurrences counted by the counter 53 reaches the first threshold, the main controller 51 brings the stacker crane 3 into an abnormal-stop state.

In the stacker crane 3, when an abnormality is recognized by the first sensor 31 to the third sensor 35 ("Yes" in step S1), the moving speed of the transporter is reduced (stopping the movement or reducing the moving speed) (step S6). After the moving speed of the transporter has been reduced, it is checked whether the abnormality becomes no longer recognized. This is because a packaging film, a label, and the like of the article W, a portion of which has been peeled, might not be recognized by the first sensor 31 to the third sensor 35 after the moving speed of the transporter has been reduced.

When no abnormality is recognized by the first sensor 31 to the third sensor 35 as a result of reducing the moving speed of the transporter ("No" in step S8), it is determined that the abnormality before the reduction in the moving speed has been recognized erroneously, and the movement of the transporter is continued.

As thus described, by continuing the movement of the transporter when the moving speed is reduced and the abnormality becomes unrecognized, it is possible to reduce the probability for an occurrence of the abnormal stop due to erroneous detection that is an article appearance abnormality (an abnormality of the article W) caused by detection of the packaging film, the label, or the like of the article W. That is, it is possible to make a determination on the abnormality stop when an abnormality is recognized by the first sensor 31 to the third sensor 35 a plurality of times, instead of immediately making a determination on the abnormal stop. As a result, a decrease in transport efficiency of the article W is able to be prevented.

Further, in the above stacker crane 3, the number of occurrences of an event related to a problem in transport is counted, and when the number of occurrences reaches the first threshold, the stacker crane 3 is brought into the abnormal-stop state. This enables appropriate detection of an abnormality in the article W. Further, this can also lead to detection of an abnormality by the first sensor 31 to the third sensor 35.

Other Preferred Embodiments

Although the plurality of preferred embodiments of the present invention have been described above, the present invention is not restricted to the above preferred embodiments, and various changes can be made in a range not deviating from the gist of the present invention. In particular, the plurality of preferred embodiments and alternative preferred embodiments described in the present specification can be combined in a freely selected manner as required.

In each process described using the flowchart illustrated in FIG. 6, the order and content of the process can be changed in a range departing from the scope of the invention.

In the first and second preferred embodiments, the stacker crane 3 is the example of the transport device, but the transport device may be an overhead traveling vehicle. The transport device may be a device that performs only traveling, such as a shuttle carriage or an automated guided vehicle (AGV). Further, the transport device may be a device that includes only a lift stage and performs only lifting and lowering. The techniques described above can also be applied to these other transport devices.

In the first preferred embodiment and the second preferred embodiment, the event counted as the number of event occurrences is the restart of movement of the transporter, but this is not restrictive. For example, the number of times an article appearance abnormality is detected by any of the first sensor 31 to the third sensor 35 may be counted as the number of event occurrences.

In the first preferred embodiment, the change in movement condition is executed when the number of event occurrences exceeds a predetermined threshold smaller than the first threshold, but this is not restrictive. For example, the change in movement condition may be executed when the number of event occurrences reaches a predetermined threshold smaller than the first threshold.

Alternatively, for example, the change in movement condition may be executed each occurrence of an event related to a problem in transport (a phenomenon in which article collapse or article protrusion of the article W is no longer detected as a result of reducing the moving speed of the transporter or stopping the transporter). This eliminates the need to determine whether the number of event occurrences has exceeded a predetermined threshold, so that the control of the transporter by the main controller 51 is simplified.

Preferred embodiments of the present invention can be widely applied to a transport device including a sensor that detects a state of an article being transported.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport device that transports an article, the transport device comprising:
    a transporter that moves from a support on which the article is supported to an empty support;
    a transfer device that is mounted on the transporter and transfers the article to and from the support;
    an abnormality detector that recognizes an abnormality of the article moved by the transporter;
    a counter that counts a number of occurrences of an event related to a problem in transport during execution of one transport command; and
    a movement controller configured or programmed to:
        reduce a moving speed of the transporter when an abnormality is recognized by the abnormality detector;
        continue the movement of the transporter when the abnormality is no longer recognized by the abnormality detector when the moving speed has been reduced; and
        bring the transport device into an abnormal-stop state when the number of occurrences of the event counted by the counter reaches a first threshold.

2. The transport device according to claim 1, wherein the movement controller is configured or programmed to change a movement condition of the transporter when the number of occurrences counted by the counter exceeds a second threshold smaller than the first threshold.

3. The transport device according to claim 1, wherein the movement controller changes a movement condition of the transporter each time the event related to the problem in transport occurs.

4. The transport device according to claim 1, wherein the movement controller brings the transporter into the abnormal-stop state when the abnormality detector recognizes the abnormality while the movement of the transporter is stopped.

5. The transport device according to claim 1, further comprising:
    a detector that recognizes the support located in a vicinity of the transfer device when the number of occurrences is counted by the counter during the movement of the transporter; and
    a notifier that notifies there is an abnormality in an article supported on the support when the number of times the support on which the article is supported is recognized by the detector exceeds a third threshold while the article is supported on the support.

* * * * *